Feb. 4, 1930.  C. J. GROVE  1,746,037
DENTAL STRESS BREAKER
Filed Oct. 6, 1927
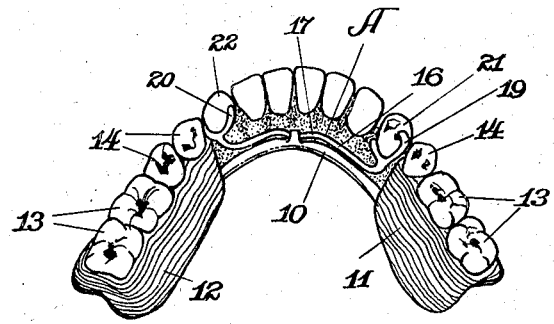
Fig. 1.
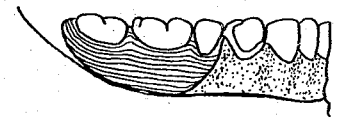
Fig. 3.
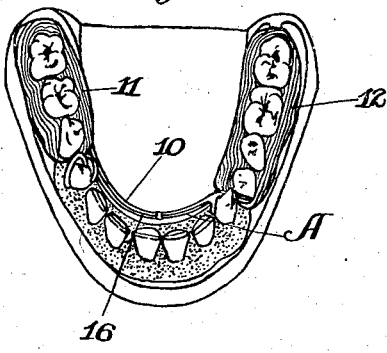
Fig. 2.
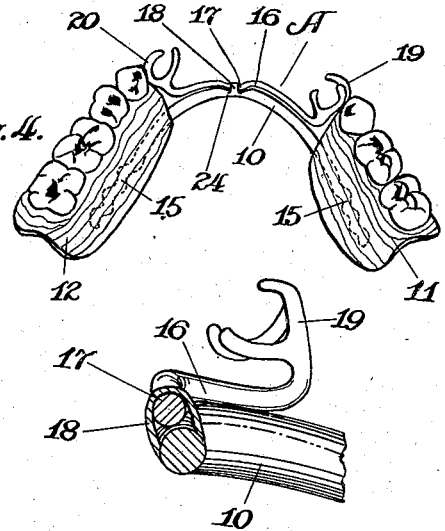
Fig. 4.
Fig. 5.
Inventor
Carl J. Grove
By Howard Fischer
Attorney Patented Feb. 4, 1930

1,746,037

UNITED STATES PATENT OFFICE

CARL J. GROVE, OF ST. PAUL, MINNESOTA

DENTAL STRESS BREAKER

Application filed October 6, 1927. Serial No. 224,376.

My invention relates to a dental stress-breaker and is particularly adapted for use in supporting a partial denture in a manner to prevent undue strain or stress on the teeth adapted to hold the partial denture.

An object of my invention resides in employing an auxiliary bar associated with the lingual bar which is adapted to hold the partial denture in proper position on the ridge of the jaw where the denture is adapted to rest and yet permit the denture to be sufficiently free to receive the movement of mastication and to permit the denture to cushion on the supporting ridge. My dental stress-breaker is designed to relieve both horizontal and lateral stress, giving almost universal movement and at the same time holding the denture firmly against the soft tissues of the mouth.

Heretofore in using a lingual bar as applied to partial denture without my stress breaker the clasps were fastened directly to the lingual bar and every movement of mastication in such a case would be reflected to the anchor teeth which resulting stress would cause a loosening of those anchor teeth, and this was a very undesirable feature of such forms of partial dentures where the clasps were fastened directly to the lingual bar. My dental stress breaker overcomes these detrimental features and provides a means of anchoring the partial denture to the teeth adjacent the partial denture without affecting the teeth with undue stress or strain by mastication on the partial denture yet firmly anchoring the partial denture in position to be carried by the soft tissues of the gum of the ridge where the partial denture is supported.

These features, together with other objects and details of my invention will be more clearly and fully set forth in the following specification and claims.

In the drawings forming part of my specification:

Figure 1 illustrates a plan view of a case where my dental stress breaker is employed, showing the same holding the partial denture to the anchor teeth.

Figure 2 is another plan view from a different position of my dental stress-breaker as it would appear in use in holding a partial denture.

Figure 3 is a side view of the same.

Figure 4 illustrates my stress-breaker and clasps removed from the anchor teeth and associated with the partial denture.

Figure 5 is an enlarged detail partly in section, showing the lingual bar and my stress-breaker with one of the clasps for the anchor teeth.

In the drawings I have illustrated a partial denture showing the lingual bar 10 supporting the plates 11 and 12 of the partial denture.

The plate 11 is illustrated with molars 13 and a bicuspid 14, while the plate 12 carries two molars 13 and two bicuspids 14.

The lingual bar 10 is formed with corrugated end portions 15 which are adapted to be anchored in the side wall of the plate portions 11 and 12 in a manner to firmly connect the lingual bar 10 thereto so that the lingual bar may form a brace between the plates 11 and 12 to hold them in position that they would assume in the individual's mouth wherein this partial denture is adapted to be placed. The lingual bar 10 forms a brace between the plates and is adapted to be spaced in a manner so as to extend slightly away from the gums so as to leave the plates of the partial denture free to slightly move in mastication without the bar 10 irritating the gum.

I provide my stress-breaker A which is composed of the auxiliary bar 16 adapted to extend longitudinally with the lingual bar 10 being formed with a recessed portion 17 positioned near the center or at the front of the lingual bar. By means of the loop 18 which is attached to the lingual bar 10 and which extends over the auxiliary bar 16 in the recess 17, I freely attach the auxiliary bar 16 to the lingual bars 10 with a swivel or universal joint permitting free movement between the lingual bar and the auxiliary bar, yet holding the lingual bar in proper position by the recess 17 in the auxiliary bar.

My stress-breaker A is provided with clasps 19 and 20 on the ends thereof which are shaped to conform with the particular teeth such as 21 and 22, to which the clasps are attached, and these clasps are made for each particular case and soldered onto the auxiliary bar. In the drawings I have illustrated the clasp 19 engaging with the bicuspid 21, while the clasp 20 is adapted to engage with the cuspid 22. These clasps 19 and 20 are formed of a suitable shape to fit around the anchor teeth so as to firmly connect with the same under spring tension to hold the stress-breaker A firmly attached thereto. The clasps 19 and 20 engage the anchor teeth in such a manner that the plates 11 and 12 may be removed if it is desired by the user of the denture and they can again be readily replaced in the mouth when it is desired. The stress-breaker A provides through the loop 18 the loose connection to permit movement of the plates 11 and 12 with the teeth supported therein during mastication without throwing an undesirable strain upon the anchor teeth as is true where the clasps are fastened directly to the lingual bar as has been done heretofore. Thus my stress-breaker A accomplishes a very desirable result in providing a means of holding partial dentures without injuring the anchor teeth.

The lingual bar may be of a heavier nature than the auxiliary bar in a manner to form a brace between the plates 11 and 12 and the auxiliary bar is preferably extended in approximately the shape of the front of the lingual bar but being provided with a recessed portion 17 so as to receive the loop 18.

The partial denture is applied to such mouths where teeth are missing and conditions are such that fixed bridge work is contra-indicated. Clasps are used to hold these dentures in place which engage the anchor teeth and my stress-breaker overcomes the heretofore undesirable construction where the dentures had the clasps attached directly thereto. The free connection of my denture to the stress-breaker provides a very desirable construction as it permits the use of a denture including two plates such as 11 and 12 or a single plate may be used on one side and the lingual bar can be terminated at the loop 18 so that the denture is held in a similar manner to the stress-breaker just as effectively for one side as it is where there are two plates as illustrated in the drawings. Where one plate such as 11 is used the lingual bar is terminated just beyond the loop 18 as indicated by the line 24 in Figure 4. This gives the proper connection to the stress-breaker A even where a single plate such as 11 is used for either side of the mouth and it will be readily comprehended that such a structure is highly desirable to protect the anchor teeth against undue strain and stress in supporting a partial denture.

In accordance with the patent statutes I have described the principles of operation of my stress-breaker and while I have illustrated a particular construction and formation of the same it is readily apparent that obvious changes may be made and that partial dentures other than those illustrated may be used within the scope of the following claims without departing from the spirit of my invention.

I claim:

1. A dental stress-breaker including, a lingual bar adapted to support a dental plate with the teeth for the denture therein, said denture being entirely supported by an auxiliary member adapted to clasp the anchor teeth and a free connection between said lingual bar and said auxiliary member to permit the denture to assume every movement of mastication without undue stress on the anchor teeth.

2. A dental stress-breaker including, a lingual member, denture plates secured to said member, an auxiliary member, clasps formed on said auxiliary member adapted to engage anchor teeth and entirely support the denture, and a free connection between said lingual member and said auxiliary member to relieve horizontal and lateral stress from the anchor teeth.

3. A stress-breaker for a partial denture including a lingual bar, a partial denture secured to said lingual bar, a stress-breaker bar, clasp means formed integral with said stress-breaker bar for entirely supporting said denture, and means for freely connecting said lingual bar to said stress-breaker bar.

4. A dental stress-breaker including, a stress-breaker bar, clasps formed integrally on the ends of said bar adapted to engage anchor teeth, a partial denture, a lingual bar engaging said partial denture and a loop extending from said lingual bar around said stress-breaker bar.

5. A dental stress-breaker comprising, a stress-breaker bar, clasps formed on the ends thereof, a recess formed in said bar, a lingual bar, a partial denture secured to said lingual bar, and a loop extending from said lingual bar around said stress-breaker bar.

CARL J. GROVE.